US008966987B2

(12) United States Patent
Clusserath et al.

(10) Patent No.: US 8,966,987 B2
(45) Date of Patent: Mar. 3, 2015

(54) ROAD SIMULATION TEST STAND (75) Inventors: Alfred Clusserath, Rossdorf (DE); Manfred Backer, Kashofen (DE); Riccardo Moller, Darmstadt (DE)

(73) Assignee: Illinois Tool Works Inc., Glenview, IL (US)

( * ) Notice: Subject to any disclaimer, the term of this patent is extended or adjusted under 35 U.S.C. 154(b) by 36 days.

(21) Appl. No.: 13/697,432

(22) PCT Filed: May 19, 2011

(86) PCT No.: PCT/US2011/037091
§ 371 (c)(1),
(2), (4) Date: Feb. 5, 2013

(87) PCT Pub. No.: WO2011/146681
PCT Pub. Date: Nov. 24, 2011

(65) Prior Publication Data
US 2013/0199284 A1 Aug. 8, 2013

(30) Foreign Application Priority Data

May 19, 2010 (EP) .................................. 101 63 319
Aug. 18, 2010 (DE) .......................... 10 2010 034 850

(51) Int. Cl.
*G01M 17/04* (2006.01)
*G01M 17/007* (2006.01)
(52) U.S. Cl.
CPC .................................. *G01M 17/007* (2013.01)
USPC ..... 73/669; 73/116.01; 73/117.01; 73/118.01
(58) Field of Classification Search
CPC ........................... G01M 17/007; G01M 17/04

USPC ........... 73/669, 670, 116.01, 116.06, 116.07, 73/116.08, 116.09, 116.11, 117.01, 73/117.02, 117.03, 118.01
See application file for complete search history.

(56) References Cited

U.S. PATENT DOCUMENTS

| 2,030,174 | A | * | 2/1936 | Kroll ............................... 73/669 |
| 3,520,180 | A | * | 7/1970 | Ris et al. ......................... 73/670 |
| 3,837,221 | A | * | 9/1974 | Odier .............................. 73/124 |
| 5,111,685 | A | * | 5/1992 | Langer ....................... 73/118.01 |
| 5,569,836 | A | * | 10/1996 | Hill .............................. 73/11.07 |
| 5,602,759 | A | * | 2/1997 | Harashima et al. ............. 702/56 |
| 5,604,296 | A | * | 2/1997 | Nozaki ........................ 73/11.04 |

(Continued)

FOREIGN PATENT DOCUMENTS

| DE | 35 07 906 | 9/1986 |
| DE | 3507906 | 9/1986 |

(Continued)

*Primary Examiner* — Eric S McCall
(74) *Attorney, Agent, or Firm* — McCarter & English, LLP (57) ABSTRACT The disclosed embodiments include a test stand (100) for the simulation of forces and moments introduced into a motor vehicle or into parts of a motor vehicle during driving operation. In order to allow a simulation of road journeys which is as realistic as possible, it being possible at the same time to dispense with vehicle-specific excitation or activation signals, there is provision, according to the invention, whereby the test stand (100) has at least one wheel contact plate (2) for receiving a vehicle wheel (1) and at least one first actuator (3a, 3b) connected at one side to the foundation (101) of the test stand (100) and at the other side to the wheel contact plate (2), for moving the wheel contact plate (2) along a first axis (L1), preferably along the vertical axis, relative to the foundation (101) of the test stand (100).

18 Claims, 5 Drawing Sheets

(56) References Cited

U.S. PATENT DOCUMENTS

| | | | |
|---|---|---|---|
| 5,610,330 A * | 3/1997 | Fricke et al. | 73/146 |
| 6,439,043 B1 * | 8/2002 | Ferris et al. | 73/146 |
| 6,962,074 B2 * | 11/2005 | Lenzen et al. | 73/121 |
| 7,540,195 B2 * | 6/2009 | Nelsen et al. | 73/669 |
| 2004/0060350 A1 * | 4/2004 | Boeck et al. | 73/122 |
| 2008/0078250 A1 * | 4/2008 | Nelsen et al. | 73/666 |
| 2008/0307855 A1 * | 12/2008 | Friedman et al. | 73/12.09 |

FOREIGN PATENT DOCUMENTS

| | | |
|---|---|---|
| DE | 10212255 | 10/2003 |
| EP | 0892263 | 1/1999 |
| GB | 1144342 | 3/1969 |
| JP | 57 091439 | 6/1982 |
| JP | S6310775 | 3/1988 |

\* cited by examiner

ROAD SIMULATION TEST STAND

BACKGROUND OF THE DISCLOSURE

This application is a National Phase Application of PCT/US2011/037091, filed on May 19, 2011.

1. Field of the Disclosure

The invention relates to a test stand for the simulation of forces and moments introduced into a motor vehicle or into parts of a motor vehicle during driving operation.

2. Description of the Prior Art

Test stands of the generic type are generally used, in particular at the end of an operational integrity validation process, to reproduce as realistically as possible the forces and loads which occur in real driving operation and which act on a vehicle to be tested or on parts of a vehicle to be tested. For this purpose, real operating load simulation tests are carried out on axle or whole-vehicle test stands in order to be able to draw conclusions regarding the effects of certain loads primarily on the operational integrity and vibration behavior of the vehicle.

In general, use is made for this purpose of axle or whole-vehicle test stands (hereinafter also referred to generally as "test stands") in which multi-axial force-time profiles at the wheel central point are realized by means of servohydraulic actuators. Here, the specifications for the force-time profiles to be realized are gathered from test track measurements during which the wheel central point forces occurring in real operation are measured by means of special measurement wheels. In a complex iterative process, corresponding generally highly dynamic activation or excitation signals for the servohydraulic actuators of the test stand are then determined such that the wheel central point forces measured on the test track are reproduced as exactly as possible on the test stand. This process, also referred to as "drive signal iteration", can take up to one week.

For example, the document U.S. Pat. No. 5,610,330 A discloses a method for determining an excitation signal for the actuators, which engage on the wheel central point of a motor vehicle to be tested, of a road simulation test stand. Here, to determine the excitation signal, it is provided that firstly, during a driving operation measurement, a vehicle equipped with a measurement wheel is driven over a test track in order, using the data gained by means of the measurement wheel, to obtain an excitation function for the actuator of the test stand. Subsequently, a second vehicle of the same type is arranged on a test stand, and the actuators of the test stand are operated according to a start excitation signal. The response parameters generated in the vehicle arranged on the test stand are measured and compared with setpoint response parameters measured in the first vehicle while it was being driven over the test track. Depending on the deviations between the response parameters measured on the test stand and the setpoint response parameters, the excitation function for the actuators of the test stand is then varied until the measured response function is consistent with the setpoint values measured during the driving operation measurement.

Such a conventional approach which is known from the prior art has the disadvantage that, to transfer the excitation signals gained iteratively for one vehicle type to the excitation signals for a vehicle of a different type, it is generally necessary for load input data of both axles of the second vehicle type to be gained anew during a driving operation measurement. In particular, it is generally not possible—proceeding from the excitation function for a first vehicle type—to reliably calculate or transfer the excitation function for a second vehicle type.

In particular, the activation or excitation signals for the actuator or the actuators of the test stand are dependent not only on the vehicle type but rather also on the vehicle variant. That is to say, if it is sought to derive a station wagon or a minivan from a sedan, it has hitherto been necessary for the entire process for determining the excitation function, including the test track measurement, to be repeated. Since the number of different variants and also the pressure for shortening development times are increasing ever further, vehicle manufacturers are demanding test stand concepts in which the activation signals are substantially invariant with respect to design changes in the vehicle. Such approaches which are invariant with respect to the vehicle type or vehicle variant are presently unknown.

A further disadvantage of the known operational integrity check for motor vehicles is that, in the conventional approaches, in general only operational load simulation tests are possible, that is to say the load input data gained during driving operation measurements for a test subject must generally be reproduced. This disadvantageously assumes that fully roadworthy vehicles are already present. With known test stand concepts, therefore, testing on the test stand can only take place relatively late in the development process. This has the disadvantage that changes in said late phase of vehicle development can be made only with greater difficulty and consequently at high cost.

Furthermore, test stand concepts are known in which the introduction of the forces into the vehicle body takes place not by means of actuators engaging on the wheel central point but rather by means of individual wheel contact plates (cf. EP 0 892 263 A2). In the case of a test stand of said type, a test vehicle is positioned, fully equipped with tires, on the respective wheel contact plates, the wheel contact plates being provided in each case with an actuator which introduces the simulation forces and which acts in the vertical direction. A disadvantage of a first type of such known test stand concepts with wheel contact plates is that these permit only a one-dimensional excitation, that is to say a one-dimensional compression of the vehicle tires with respect to the respective spring system of the wheel suspension. In this way, the field of use is effectively restricted to the transmission of the excitation via the wheel contact plates from one specific spring system to further specific spring systems. In other words, with such known test stand concepts with wheel contact plates of the first type, it is thus not possible to introduce further excitation signals, which go beyond the one-dimensional compression, into the vehicle body in order thereby to be able to simulate as precisely as possible the effects of certain loads primarily on the operational integrity and the vibration behavior of the vehicle.

In a second type of known test stand concepts with wheel contact plates, there are provided for each wheel contact plate a plurality of additional actuators, which are connected to a common fastening structure, in order to be able, via the wheels positioned on the wheel contact plates, to introduce into the vehicle body even forces which do not act in the vertical direction (in the spring direction) (cf. DE 102 12 255 A1). For this purpose, the common fastening structure has a horizontal base plate for the fastening of the vertical actuator, and a plurality of supports which run perpendicular thereto, the additional actuators being fastened to said supports. A disadvantage of said second type of known test stand concepts with wheel contact plates is that a large structural volume is required on account of the multiplicity of required individually suspended actuators per wheel contact plate. Furthermore, the additional actuators fastened to the supports yield the further disadvantage that the forces introduced by said additional actuators cannot be correlated with vehicle-physical variables, and in particular cannot be attributed in a simple way to the simulated track profile.

SUMMARY OF THE INVENTION

The present invention is based on the object of further developing a test stand of the type specified in the introduction so as to allow as realistic as possible a simulation of road journeys, in particular of intensively damaging tracks, wherein at the same time the test stand should be constructed such that vehicle-specific excitation or activation signals can be dispensed with for the actuators of the test stand, such that the test stand is, overall, substantially invariant with respect to design changes in the vehicle. In particular, the test stand should be designed to be able, for different vehicle types or vehicle variants, to simulate as realistically as possible the forces and loads which act on the vehicle, or on parts of the vehicle, during driving operation, without a predetermined excitation signal for the specific vehicle type or for the specific vehicle variant being required for this purpose. Furthermore, the test stand should have the smallest possible structural volume while being of the simplest possible design.

Said object is achieved according to the invention by means of the subject matter of independent patent claim 1. Advantageous refinements are specified in the dependent claims.

Accordingly, in particular, a test stand is proposed for the simulation of forces and moments introduced into a motor vehicle or into parts of a motor vehicle during real driving operation, the test stand having at least one wheel contact plate for receiving a vehicle wheel, and at least one first actuator, connected at one side to the foundation of the test stand and at the other side to the wheel contact plate, for moving the wheel contact plate along a first axis, preferably along the vertical axis, relative to the foundation of the test stand, the at least one first actuator being connected to the wheel contact plate in such a way that the wheel contact plate is rotatable about a first preferably horizontally running tilting axis, and the test stand also having at least one second actuator, engaging on the wheel contact plate, for rotating the wheel contact plate about the first preferably horizontally running tilting axis.

In the concept proposed according to the invention, the test stand is designed such that the introduction of force into the vehicle to be tested or into the vehicle part to be tested takes place such that the excitation states of the vehicle or of the vehicle part can be reproduced realistically, that is to say in particular beyond a purely vertical excitation, such that the influences of the road on the vehicle or vehicle part can be simulated in a realistic manner on the test stand. In particular, it was recognized here that the load state event sequences to be reproduced in the simulation of the forces and loads which occur in real driving operation and which act on the vehicle or vehicle part arise from the total force, in terms of magnitude and direction and the change thereof over time, at the point of contact between the vehicle wheel and the roadway surface. For this purpose, it is provided according to the invention that, by means of the actuators of the test stand, the corresponding multi-dimensional excitation forces must be introduced into the vehicle to be tested via the vehicle wheel and not—as is conventional—via the wheel central point. Because the wheel central point is not invariant with respect to the vehicle, the conventional and previously described approaches, in which the test forces are introduced by means of one or more wheel set bodies connected to the wheel flanges, are not suitable for forming a variant-compatible test stand.

In fact, in the solution according to the invention, it is provided that the vehicle wheel or the vehicle wheels are incorporated into the test stand, since it has been recognized in the present case that, to realize a test stand concept which is invariant with respect to vehicle variants, the roads themselves should serve as the excitation.

By virtue of the fact that, according to the invention, an intentional departure has been made from a wheel-central-point-coupled road simulation test stand and the introduction of the test forces and test moments takes place via the vehicle tire(s), the simulation test stand according to the invention is suitable for being variant-compatible. In other words, using one and the same excitation signal which represents a vehicle-independent road profile function, it is possible with the test stand proposed in this document to test different vehicle types or vehicle variants, wherein it is possible in particular to dispense with vehicle-individual excitation functions for a specific vehicle.

In particular, it is provided in the solution according to the invention that the test stand has at least one wheel contact plate which serves to receive a vehicle wheel of the vehicle to be tested. Accordingly, in the solution according to the invention, the introduction of force takes place not via the wheel central point or the wheel central points but rather via the wheel contact point itself. Secondly, the actuators of the test stand engage on the wheel contact plate, such that the vehicle wheel and the road excitation are incorporated into the test stand according to the invention. This is the case because, for different vehicle types or vehicle variants, the roads constitute the actual invariant. In other words, in the test stand according to the invention, the actuators which engage on the wheel contact plate introduce the force flow via the wheel contact point into the vehicle wheel and from there into the vehicle, such that the real introduction mechanism of road/vehicle wheel/vehicle is realized in the test stand.

The expression "wheel central point" (or "wheel center") used in this document is to be understood to mean the point of intersection of the axis of rotation of the wheel with the wheel central plane. In contrast, the expression "wheel contact point" (or "center of tire contact") is to be understood to mean the point of intersection of the wheel central plane with the vertical projection of the wheel axis of rotation onto the roadway plane or the wheel contact plate.

In the solution according to the invention, therefore, the vehicle to be tested, already equipped with tires, stands on the respective wheel contact plates, wherein each wheel contact plate can be moved relative to the foundation of the test stand in a decided manner by means of actuators. Here, for each wheel contact plate of the test stand, there is provided a first actuator, connected at one side to the foundation of the test stand and at the other side to the wheel contact plate, for moving the wheel contact plate along a first axis, preferably along the vertical axis, relative to the foundation of the test stand. Accordingly, a decided vertical movement of the associated wheel contact plate and therefore a lifting of the vehicle wheel standing on the wheel contact plate is possible by means of the first actuator. In particular, it is possible in this way for the individual vehicle wheels to be lifted to different extents if the test stand has a wheel contact plate with an associated first actuator for each vehicle wheel.

The expression "actuator" used in this document is to be understood to mean any motion control unit which engages on the at least one wheel contact plate and which is designed to move the wheel contact plate relative to the foundation of the test stand according to a predefined or predefinable event sequence. As actuators, consideration is given in particular to servohydraulic or servopneumatic motion control units, that is to say units in which a hydraulically or pneumatically actuable piston engages on the wheel contact plate. It is however self-evidently also conceivable for the motion control unit to have an electrically actuable piston or the like.

To be able, by means of the test stand according to the invention, to simulate the action of longitudinal and side forces acting on the vehicle to be tested introduced into the vehicle via a wheel contact point, it is provided in a preferred embodiment that the wheel contact plate of the test stand is not only movable relative to the foundation of the test stand in the vertical direction but rather is also rotatable about at least one preferably horizontally running tilting axis. In a preferred realization of the solution according to the invention, it is provided here in particular that the wheel contact plate is rotatable about a first preferably horizontally running tilting axis and also about a second likewise preferably horizontally running tilting axis, wherein the first tilting axis runs obliquely, that is to say not parallel, and preferably perpendicularly or at least substantially perpendicularly, with respect to the second tilting axis.

The tilting or rotation of the wheel contact plate about the first or second tilting axis relative to the foundation of the test stand may be effected for example by means of suitably arranged and designed actuators which are provided in addition to the first actuator which—as already explained—serves to move the wheel contact plate along a first axis, preferably along the vertical axis, relative to the foundation of the test stand. Said further actuators engage preferably directly on the corresponding wheel contact plate.

In a preferred realization of the test stand according to the invention, it is provided that, firstly, the at least one wheel contact plate is engaged on by the first actuator by means of which the wheel contact plate can be moved in the vertical direction relative to the foundation of the test stand, and secondly, the wheel contact plate is engaged on by at least one second actuator which serves to rotate the wheel contact plate relative to the foundation of the test stand about a first preferably horizontally running tilting axis. Said first tilting axis may for example run parallel to the longitudinal axis of the vehicle standing on the test stand. It is of course however also conceivable here for the first preferably horizontally running tilting axis to be an axis running perpendicular to the longitudinal axis of the vehicle.

To be able, in the case of the latter preferred realization of the test stand, to attain that the wheel contact plate can be rotated relative to the foundation of the test stand about the first tilting axis by means of the at least one second actuator, it is provided that the first actuator, by means of which the wheel contact plate can be moved in the vertical direction relative to the foundation of the test stand, is connected to the wheel contact plate in such a way that the wheel contact plate can be rotated about the first tilting axis by means of the at least one second actuator.

If the first tilting axis about which the wheel contact plate can be rotated by means of the at least one second actuator runs parallel to the longitudinal axis of the vehicle, it is therefore possible for side forces and moments to be introduced into the vehicle wheel. In contrast, if the first horizontally running tilting axis runs perpendicular to the longitudinal direction of the vehicle, it is possible by means of a tilting movement of the wheel contact plate for longitudinal forces to be introduced into the vehicle wheel via the wheel contact point.

In order that the effect of longitudinal forces, side forces and vertical forces on the vehicle can be simulated by means of the test stand according to the invention, it is preferably provided that the at least one wheel contact plate of the test stand is both movable vertically relative to the foundation of the test stand and also rotatable both about a first preferably horizontally running tilting axis and also about a second preferably horizontally running tilting axis, the first tilting axis running obliquely, that is to say not parallel, and in particular perpendicularly, with respect to the second tilting axis. Here, in a preferred realization of the test stand according to the invention, it is provided that the test stand has, in addition to the first actuator which serves for moving the wheel contact plate preferably along the vertical axis, at least one second actuator engaging on the wheel contact plate and also at least one third actuator likewise engaging on the wheel contact plate. The at least one second actuator engaging on the wheel contact plate is designed to rotate the wheel contact plate relative to the foundation of the test stand about a first preferably horizontally running tilting axis, while the at least one third actuator serves to rotate the wheel contact plate about a second preferably horizontally running tilting axis, the second tilting axis running obliquely with respect to the first tilting axis and preferably perpendicular to the first tilting axis.

With the latter embodiment of the test stand according to the invention, it is possible to obtain in particular a reproduction, accurate in terms of phase and amplitude, of the vertical forces, longitudinal forces and lateral forces which occur in real driving operation. Furthermore, the force flow from the test stand via the wheel contact point of the vehicle wheel into the vehicle reflects the real introduction mechanisms from the road via the vehicle tires into the vehicle. As a result of the wheel contact plate which is designed to be tiltable, no external actuating devices (actuators) are required to introduce longitudinal forces or lateral forces into the vehicle. This results in a compact design of the device according to the invention, as a result of which already known test stands, such as four-plunger or multiple-plunger systems, can be retrofitted without great expenditure.

In a preferred realization, it is provided that the first actuator has a hydraulically, pneumatically or electrically actuable piston which is movable along the first axis (preferably vertical axis) relative to the foundation of the test stand, the at least one second and—if provided—also the at least one third actuator being connected on the one hand to the piston and on the other hand to the wheel contact plate. In this way, it is possible to realize a high degree of correlation of the first actuator with the vertical force and at the same time a correspondingly high degree of correlation of the tilting angle with the longitudinal or lateral force. It is accordingly possible to make the "drive signal iteration" process mentioned at the outset simpler and faster and, here, to make the activation signals at least substantially independent of the vehicle variant. In particular, the tilting movement of the wheel contact plate about the longitudinal or transverse axis of the vehicle wheels can be correlated directly with an actuation of the at least one second or of the at least one third actuator. The activation signals of the actuators can therefore be interpreted directly as an abstract test track profile.

It is conceivable for the first actuator to be connected to the wheel contact plate via a joint arrangement which allows a rotational movement of the wheel contact plate relative to the foundation of the test stand. In this way, the wheel contact plate can be tilted in any desired directions with respect to the vehicle wheels, and here, is not restricted only to the longitudinal and transverse axes of the vehicle wheels. It is consequently possible to precisely set the direction of the forces introduced into the vehicle and thereby reliably reproduce test track characteristics in a simple manner.

A suitable joint arrangement here is for example a ball joint or a cardan joint. It is alternatively possible for the joint arrangement to have a first rotary joint which allows a rotational movement of the wheel contact plate about the first preferably horizontally running tilting axis relative to the foundation of the test stand, the joint arrangement preferably also having a second rotary joint which allows a rotational movement of the wheel contact plate about the second preferably horizontally running tilting axis relative to the foundation of the test stand.

In one realization of the test stand according to the invention, the second and third actuators are designed in each case as tilting cylinders and are articulatedly connected to the first actuator, in particular to the deployable and retractable piston of the first actuator. Accordingly, the inclination of the wheel contact plate is defined directly by means of the difference between the cylinder travels of the tilting cylinders (second and third actuators).

The second and third actuators are preferably designed and arranged with regard to the wheel contact plate such that the crossing point of the first and second tilting axes in the non-deflected state of the wheel contact plate lies vertically below a contact point of the vehicle wheel, such that during tilting about the first and/or second tilting axis or about the longitudinal axis and/or transverse axis of the vehicle, the contact point remains in its position or is offset only minimally, in particular with respect to the first axis (vertical axis). If the first and second tilting axes lie in a plane, such as would be the case for example if the first actuator were connected to the wheel contact plate by means of a ball joint, then the point of intersection of the first and second tilting axes in the non-deflected state of the wheel contact plate lies exactly vertically below the contact point of the vehicle wheel.

In this way, tilting angles about the first and second tilting axes and a deflection along the first vertical axis are decoupled from one another. It is therefore made considerably easier for the predetermined deflection along the first axis and the tilt about the tilting axes to be defined from measured data of a real test track.

To be able, using the test stand according to the invention, to simulate the effect on the vehicle to be tested of steering forces introduced into the vehicle via a wheel contact point, it is provided in one embodiment that the wheel contact plate of the test stand is also designed to be rotatable about an axis of rotation D relative to the foundation of the test stand, the axis of rotation D running obliquely with respect to the first tilting axes and obliquely with respect to the second tilting axis, and the test stand having a third rotary joint. The axis of rotation D is preferably aligned substantially in the direction of the vertical axis of the test stand.

The rotation of the wheel contact plate about the axis of rotation D relative to the foundation of the test stand may be effected for example by means of suitably arranged and designed fourth actuators which are provided in addition to the first, second and third actuators. Said fourth actuators preferably engage directly on the corresponding wheel contact plate.

Said rotation about the axis of rotation D advantageously allows a torque about the vertical axis of the wheel to be introduced into the wheel contact point, and therefore also makes it possible to simulate steering forces which may occur during vehicle operation.

According to one advantageous refinement of the test stand according to the invention, the support elements have, at their edge regions, stop elements in the direction of the transverse axis and in the direction of the longitudinal axis of the vehicle wheels. The tilting of the support element may under some circumstances result in slipping of the vehicle wheel on the support element. For this reason, it is advantageous for stop elements to be provided on the edge regions of the support element in order to limit the freedom of movement of the vehicle wheels and of the vehicle.

To regulate the excitations introduced into the vehicle, each individual actuator is preferably provided with a travel sensor which acts for example inductively.

In one embodiment, the test stand has sensors designed to measure the deflection along the first axis and the tilting angle about the second and third axes and to output the measured values as corresponding signal. A controller is provided which has a signal connection to the sensors and which serves to compare the measured values with predetermined setpoint values and activate the actuating devices such that the deviation is regulated to a minimum value.

The controller is advantageously designed such that the predetermined values for the deflection and the tilting are assumed to be independent of load-induced properties of the actuators.

If different vehicle models are to be tested on the test stand, then it is desirable to be able to convert the test stand quickly and easily for the different vehicle types. To ensure this, in a preferred realization of the solution according to the invention, each wheel contact plate together with the associated motion control units (actuators) for the excitation of said wheel contact plate is arranged on a base plate mounted so as to be displaceable relative to the foundation. Each wheel contact plate may thus be moved to the desired position quickly and easily, without system-induced conflicts, by displacing the corresponding base plate as a whole, in order thereby to adjust the test stand to the required wheelbase and track width values.

In a preferred realization of the solution according to the invention, there is provided for each vehicle wheel a wheel contact plate with a reception dish for receiving the respective vehicle wheel. Each wheel contact plate is provided with motion control units (actuators) by means of which fast changes in displacement per unit time can be introduced into the wheel contact plate in the vertical, longitudinal and transverse directions of the vehicle. Said introduced forces and moments are then transmitted via the associated reception dish to the vehicle wheel. The test stand according to the invention therefore permits translatory excitations of the vehicle in all three spatial directions and the introduction of drive and braking moments, wherein said excitations are introduced into the vehicle via the wheel contact point of the vehicle wheel or the wheel contact points of the vehicle wheels.

By using a suitable control application, it is possible by means of the test stand, aside from the translatory reactions of the vehicle in all three spatial directions, to also realistically reproduce the roll-pitch-yaw reactions to any desired road states. The test stand is therefore suitable for example for the temporally offset testing of a complete vehicle for partial operational integrity defects, for defects in the use of connecting elements, and for inadequate component clearances. In particular, the test stand is therefore suitable as an auxiliary aid during vehicle development in order to obtain an optimization of the vehicle's own weight without losses in long-term vehicle quality and robustness in real driving operation.

The reception dishes which receive the vehicle wheels on the test stand and which effect the transmission of the excitation states from the wheel contact plates via the respective wheel contact points to the vehicle wheels are expediently provided, on their base and side surfaces, with rotatably mounted rolling bodies or rotatably mounted balls or the like, such that the vehicle wheels are firstly held securely in the reception dishes but secondly can oscillate freely in their reception dishes. A consistent low level of friction is obtained in this way.

To attain the highest possible degree of flexibility with regard to the different vehicle types to be tested on the test stand, it is advantageous for the wheel contact plates to be provided with a three-dimensional mechanical grid-type clamping system, which allows a displacement of the base and/or side faces and therefore an adaptation of the reception dishes to vehicle wheels of different diameter and of different width (and for example also to a twinned arrangement of tires).

It is alternatively or additionally conceivable for the reception dishes to be designed to be exchangeable in order to provide the wheel contact plates with correspondingly adapted reception dishes according to the diameter and/or the width of the vehicle wheels.

The reception dishes may either be mounted preferably releasably on the corresponding wheel contact plates or connected directly to the respective actuators. In the latter case, the wheel contact plates themselves would thus be designed as reception dishes.

BRIEF DESCRIPTION OF THE DRAWINGS

Embodiments of the solution according to the invention will be described below on the basis of the appended drawings, in which.

In the appended drawings, identical or functionally identical components of the test stand are provided with the same reference symbols.

DETAILED DESCRIPTION OF THE PREFERRED EMBODIMENT

Exemplary embodiments of the test stand according to the invention will be described in more detail below with reference to the appended drawings. The drawings illustrate in each case only one wheel contact plate with the associated actuator units. It is however self-evidently conceivable for the test stand to have more than only a single wheel contact plate. If complete vehicles are to be tested on the test stand, then it is desirable for the test stand to have a wheel contact plate for each vehicle wheel, wherein each wheel contact plate is assigned corresponding actuators in order to be able to move the individual wheel contact plates independently of one another relative to the foundation of the test stand.

A first embodiment of the test stand 100 according to the invention is shown in FIGS. 1a to 1d. As illustrated, the test stand 100 has at least one wheel contact plate 2 for receiving a vehicle wheel 1. Furthermore, for each wheel contact plate 2 there is provided a first actuator 3a, 3b which is connected at one side to the foundation 101 of the test stand 100 and at the other side to the wheel contact plate 2. The first actuator 3a, 3b serves to move the wheel contact plate 2 along a first axis L1 relative to the foundation 101 of the test stand 100. In the illustrated embodiment, the first axis L1 is the vertical axis.

The first actuator 3a, 3b has a hydraulically, pneumatically or electrically actuable piston 3b which can be deployed out of and retracted into a cylinder 3a. The upper end region of the piston 3b is connected to the central point of the wheel contact plate 2. In detail, for this purpose, use is made of a joint arrangement 9 which is designed such that the wheel contact plate 2 connected to the upper end region of the piston 3b is rotatable about a first tilting axis K1 which runs horizontally in the drawings.

The joint arrangement 9 by means of which the upper end region of the piston 3b is connected to the wheel contact plate 2 is on the other hand designed such that the wheel contact plate 2 is also rotatable about a second tilting axis K2 which runs horizontally in the drawings. As illustrated, the second tilting axis K2 runs preferably at right angles to the first tilting axis K1.

To be able to effect a tilting movement of the wheel contact plate 2 relative to the foundation 101 of the test stand 100, at least one second actuator 4, 5 is provided which engages on the wheel contact plate 2 and which serves to rotate the wheel contact plate 2 about the first tilting axis K1. Use is also made of at least one third actuator 6, 7 which engages on the wheel contact plate 2 and which serves to be able to rotate the wheel contact plate 2 about the second tilting axis K2.

In detail, in the embodiment illustrated in FIGS. 1a to 1d, it is provided that a total of two second actuators 4, 5 are used, said two actuators 4, 5 being arranged on both sides of the first axis L1 and engaging in each case on the wheel contact plate 2. In the embodiment illustrated in FIGS. 1a to 1d, use is nevertheless also made of two third actuators 6, 7 which are likewise arranged on both sides of the first axis L1 and engage in each case on the wheel contact plate.

In the illustrated embodiments, the second and third actuators are designed in each case as pneumatically or hydraulically actuable piston-cylinder arrangements. It is however self-evidently also conceivable to use double-acting piston-cylinder arrangements which can transmit both tensile and also compressive forces to the wheel contact plate 2. In this case, it is sufficient for in each case only one second and/or one third actuator to engage on the wheel contact plate 2.

The first embodiment according to FIGS. 1a to 1d differs from the embodiment illustrated in FIGS. 2a to 2d in particular in that, in the first embodiment, the second and third actuators 4, 5 and 6, 7 are connected to the piston 3b of the first actuator in each case via a bridge element 11. In detail, the respective second and third actuators 4, 5 and 6, 7 are in each case connected to the bridge element 11, so as to be pivotable about a horizontal axis, by means of a joint 10, such that during the tilting of the wheel contact plate 2, the actuators 4, 5 and 6, 7 are pivotable in a vertical plane relative to the foundation 101 of the test stand 100.

The embodiment of the test stand 100 according to the invention illustrated in FIGS. 2a to 2d substantially corresponds to the embodiment described above with reference to FIGS. 1a to 1b, wherein here, however, the second and third actuators 4, 5 and 6, 7 are not connected to the piston 3b of the first actuator. In fact, it can be seen in the second embodiment that the actuators 4, 5 and 6, 7 are connected at one side directly to the foundation 101 of the test stand 100 and at the other side to the wheel contact plate 2.

In the illustrated exemplary embodiments, the first actuator 3a, 3b is designed in the form of a double-acting cylinder-piston arrangement, wherein the piston 3b of the first actuator can be pneumatically, hydraulically or electrically deployed out of and retracted into the cylinder 3b, which is fixedly connected to the foundation 101 of the test stand 100, in the vertical direction in order to be able to introduce vertical forces via the wheel contact point into the vehicle wheel 1 positioned on the wheel contact plate.

In detail, in the illustrated exemplary embodiments, the piston 3b of the first actuator is connected to the wheel contact plate 2 via a joint arrangement 9 which allows a rotational movement of the wheel contact plate 2 relative to the foundation 101 of the test stand 100. Here, the joint arrangement is designed as a ball joint, wherein it is however self-evidently also conceivable to use for example two rotary joints connected to one another or a cardan joint etc.

The tilting of the wheel contact plate 2 about a second tilting axis K2 (in this case the longitudinal axis of the vehicle wheel 1) takes place by means of suitable activation of the third actuators 6, 7. The wheel contact plate 2 can also be rotated about the first tilting axis K1 (in this case the transverse axis of the vehicle wheel 1) by virtue of the second actuators 4, 5 being suitably activated. In the illustrated embodiments, the second and third actuators are designed in each case as single-acting hydraulically or pneumatically actuable cylinder-piston arrangements. The respective tilting cylinder pairs are attached to opposite ends of the underside of the wheel contact plate 2. Accordingly, the inclination of the wheel contact plate 2 is defined directly by the difference between the cylinder travels of the tilting cylinders. Upon actuation of the second and third actuators 4, 5 and 6, 7, which are designed in each case as a cylinder-piston arrangement, the wheel contact plate 2 is inclined corresponding to the difference between the piston travels of the cylinder-piston arrangements.

It is self-evidently also possible instead of the pairs of second and third actuators to use individual actuating devices which act in both directions, such as for example double-acting hydraulic cylinders.

In detail, in the illustrated embodiments, the second actuators 4, 5 are connected to the wheel contact plate 2 via a joint arrangement 8, preferably via a cardan joint. Furthermore, the third actuators 6, 7 are likewise connected to the wheel contact plate 2 via a joint arrangement 8', preferably via a cardan joint.

Furthermore—as already mentioned—in the first embodiment according to FIGS. 1a to 1d, the second and third actuators are articulatedly connected to a connecting element 11 which in turn is connected to the piston 3b of the first actuator. This makes it possible for the test stand concept proposed in this document to be transferred to conventional four-plunger or multiple-plunger systems without great outlay.

The wheel contact point, that is to say the point of intersection of the wheel central plane with the vertical projection of the wheel axis of rotation onto the wheel contact plate 2, preferably lies above a crossing point of the first and second tilting axes K1, K2. Therefore, during the tilting of the wheel contact plate 2, the position of the wheel contact point along the vertical axis (first axis L1) does not change or changes only minimally, and the movement along the vertical axis L1 is decoupled from the tilting movements about the tilting axes K1, K2. If—as is illustrated in the drawings—the first axis L1 is the vertical axis, then a tilting of the wheel contact plate 2 about the longitudinal or transverse axis duly results in force components being introduced into the vehicle wheel 1 along said axes via the wheel contact point, but the vehicle wheel 1 does not move along the first axis L1 because the amplitude for said movement is proportional to the spacing from the crossing point in the plane spanned by the tilting axes K1, K2. If said spacing of the contact surface to the crossing point is zero, then consequently the amplitude in the direction of the first axis L1 is also zero. If the two tilting axes K1, K2 lie in a plane, which would be the case for example if the piston 3b of the first actuator were connected to the wheel contact plate 2 via a ball joint, then the point of intersection of the two tilting axes K1, K2 takes the place of the crossing point.

Figure 1A:
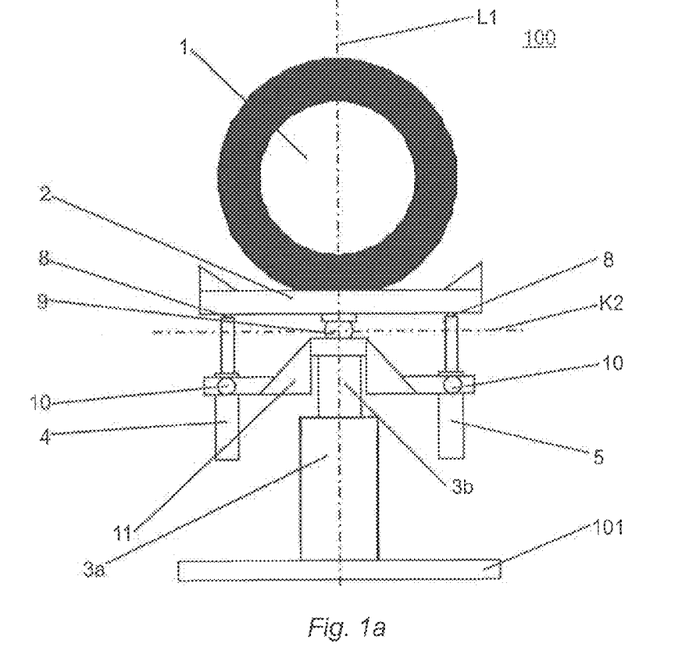
FIG. 1a shows a side view of a vehicle wheel standing on a wheel contact plate of a test stand according to a first embodiment, the wheel contact plate being in a non-deflected state.
Figure 1B:
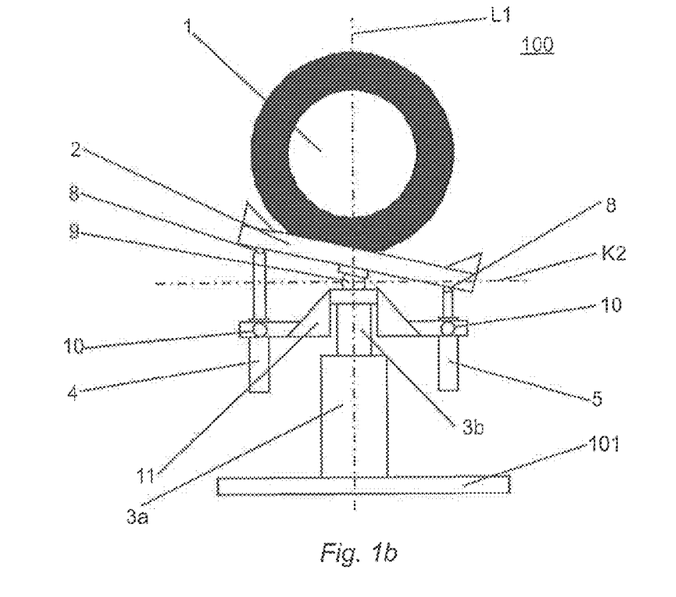
FIG. 1b shows a side view of the vehicle wheel standing on the wheel contact plate of the test stand according to FIG. 1a, the wheel contact plate being deflected relative to the foundation of the test stand.
Figure 1C:
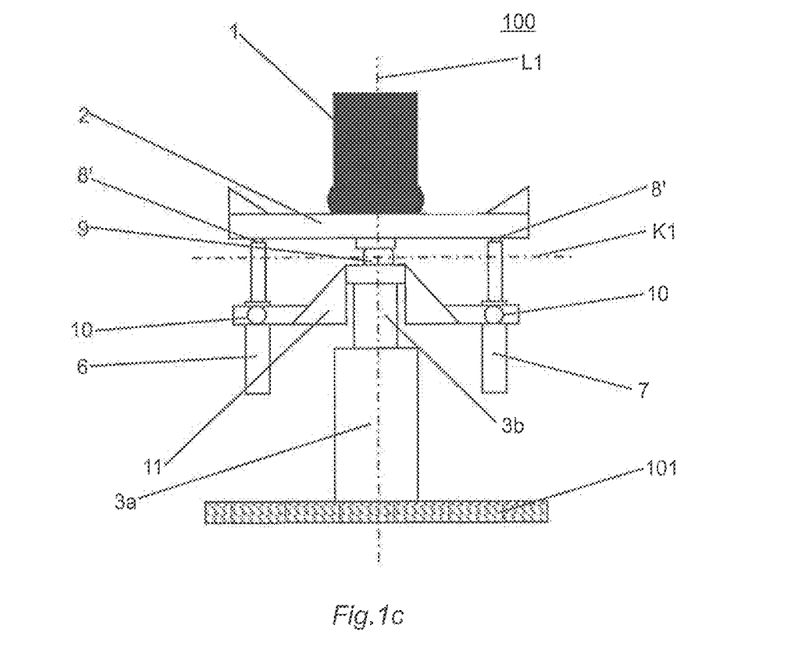
FIG. 1c shows a frontal view of the vehicle wheel standing on the wheel contact plate of the test stand according to FIG. 1a, the wheel contact plate being in a non-deflected state.
Figure 1D:
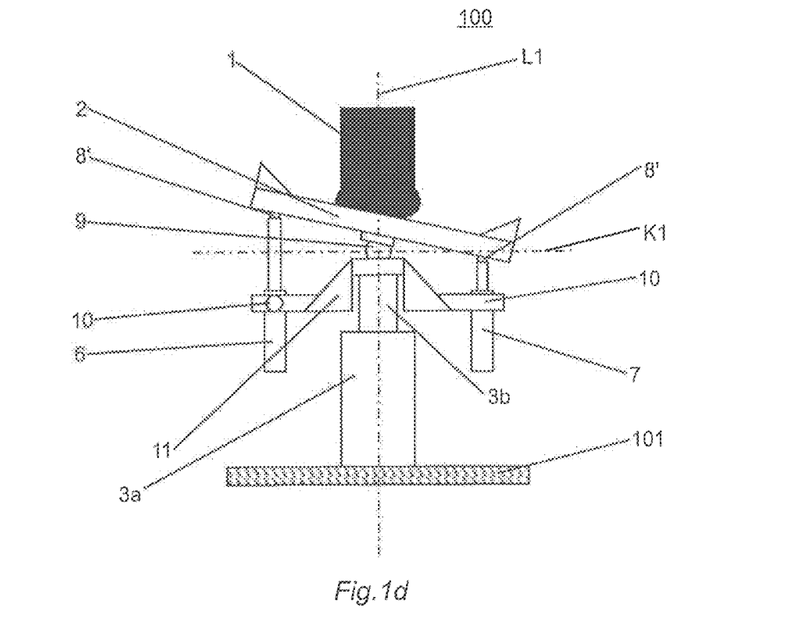
FIG. 1d shows a frontal view of the vehicle wheel standing on the wheel contact plate of the test stand according to FIG. 1a, the wheel contact plate being deflected relative to the foundation of the test stand.
Figure 2A:
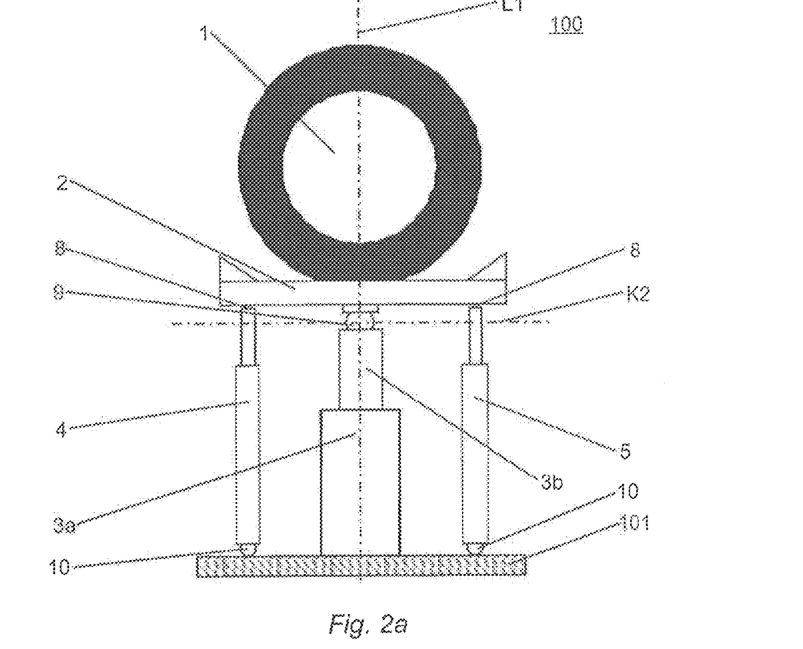
FIG. 2a shows a side view of a vehicle wheel standing on a wheel contact plate of a test stand according to a second embodiment, the wheel contact plate being in a non-deflected state.
Figure 2B:
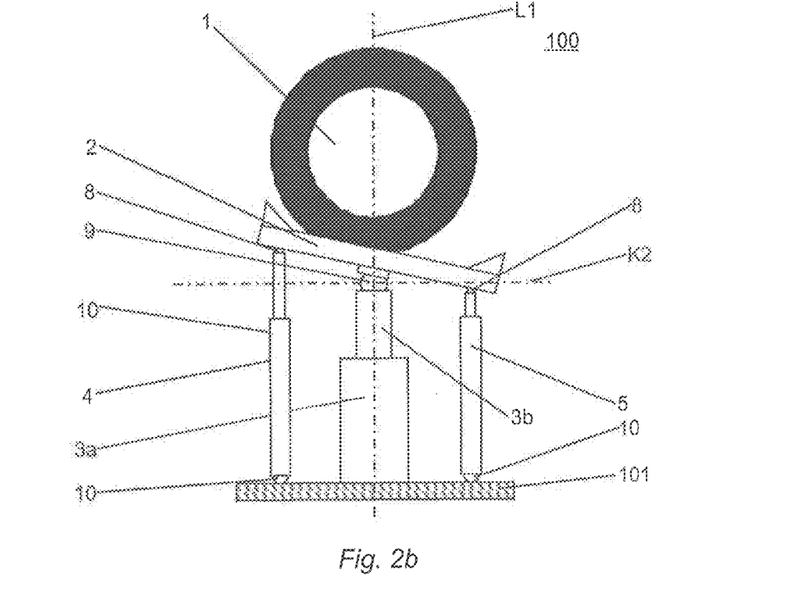
FIG. 2b shows a side view of the vehicle wheel standing on the wheel contact plate of the test stand according to FIG. 2a, the wheel contact plate being deflected relative to the foundation of the test stand.
Figure 2C:
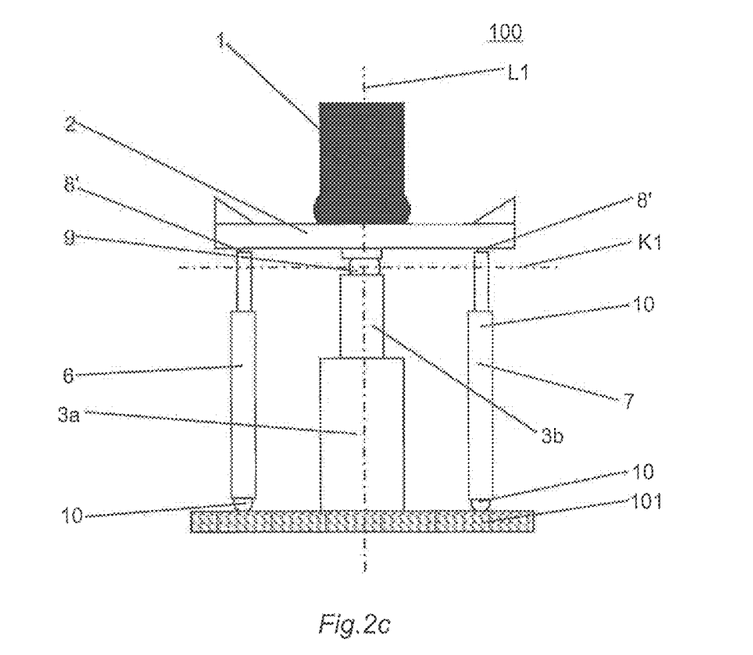
FIG. 2c shows a frontal view of the vehicle wheel standing on the wheel contact plate of the test stand according to FIG. 2a, the wheel contact plate being in a non-deflected state.
Figure 2D:
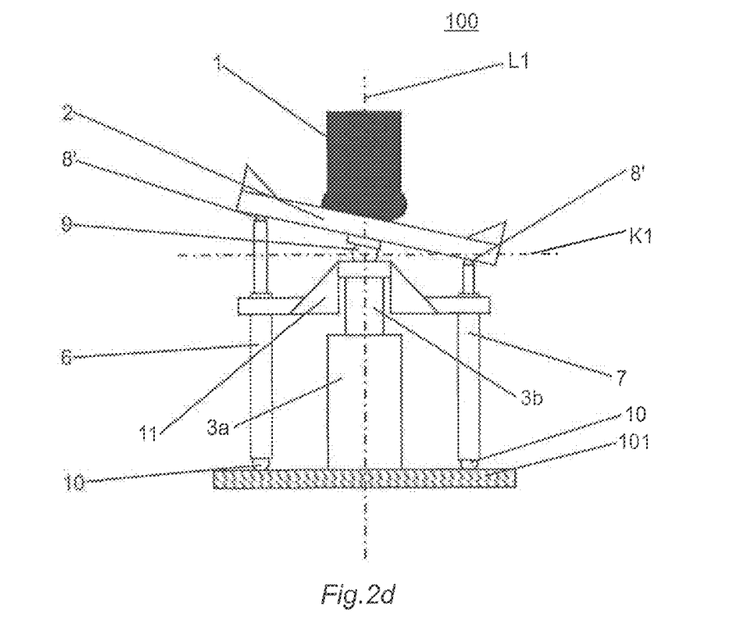
FIG. 2d shows a frontal view of the vehicle wheel standing on the wheel contact plate of the test stand according to FIG. 2a, the wheel contact plate being deflected relative to the foundation of the test stand.
Figure 3A:
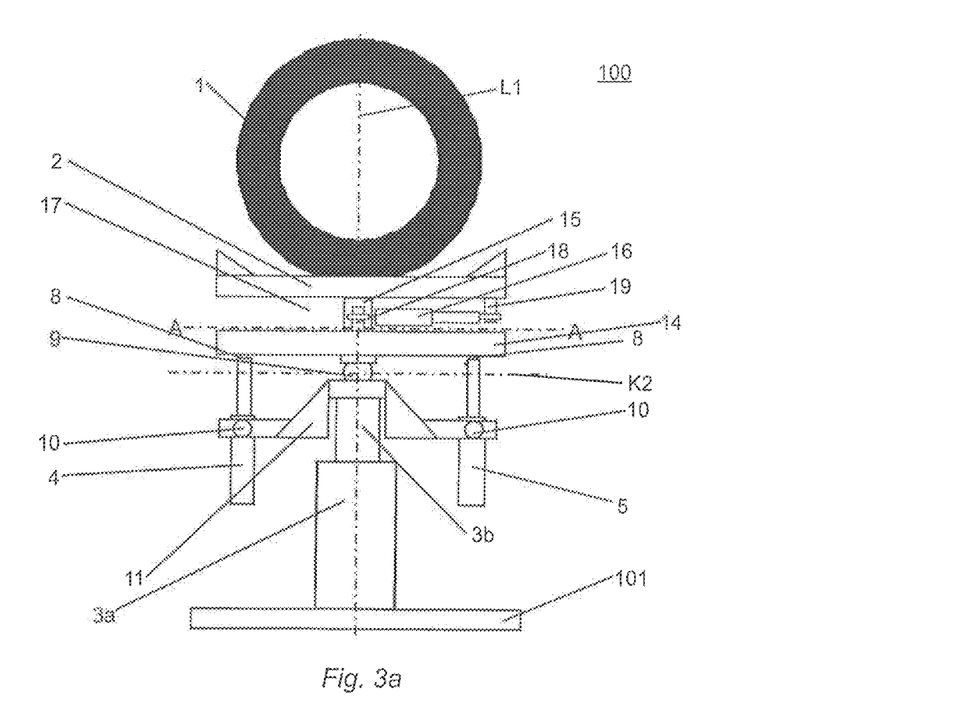
FIG. 3a shows a side view of a vehicle wheel standing on a wheel contact plate of a test stand according to a third embodiment.
Figure 3B:
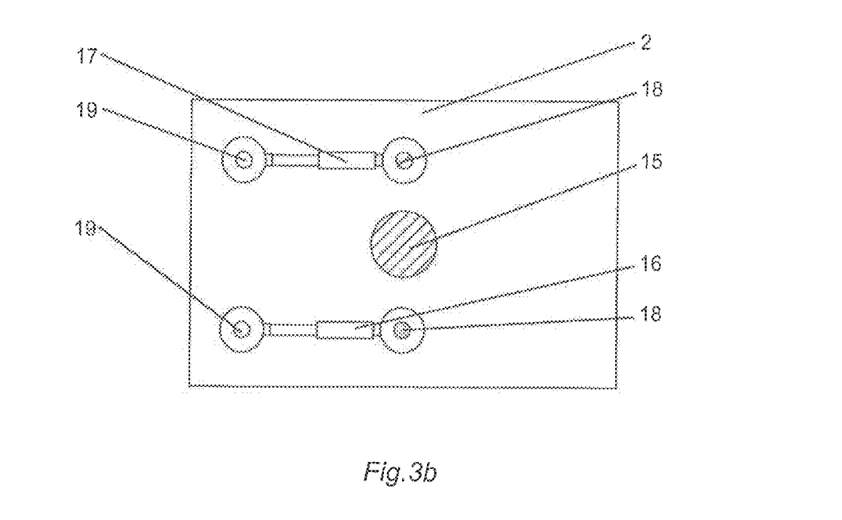
FIG. 3b shows a partial sectional view of the wheel contact plate along the line A-A in FIG. 3a from below.

FIGS. 3a and 3b illustrate a further possible embodiment of the present invention. In said embodiment, in addition to the vertical movement along the axis L1 and the tilting movements about the substantially horizontally aligned tilting axes K1 and K2, a rotation of the wheel contact plate 2 about an axis of rotation D which runs substantially parallel to the vertical axis L1 is also permitted.

In detail, in said embodiment, the wheel contact plate 2 of FIGS. 1 and 2 is replaced by a pedestal plate 14 which, as already described, can be moved through the test stand 100 vertically along the axis L1 and tilted about the axes K1 and K2. With regard to a rotation about the vertical axis L1, the pedestal plate 14 is fixed with respect to the first actuator 3a, 3b and therefore also relative to the foundation 101. Said pedestal plate 14 is in turn connected by means of a third rotary joint 15 to the wheel contact plate 2 such that the pedestal plate 14 and the wheel contact plate 2 can be moved rotationally relative to one another about an axis of rotation D which is aligned perpendicular to the planes spanned by the pedestal plate 14 and the wheel contact plate 2. The pedestal plate 14 and wheel contact plate may for example be connected to one another by means of an axle or shaft.

The rotational movement may be effected, as illustrated in FIGS. 3a and 3b, by means of fourth actuators 15, 16 which are designed as single-acting hydraulic cylinders. The actuators 15, 16 are in engagement at one end with a fastening bolt 18 attached to the pedestal plate 14. The other end of the actuators is in engagement with a fastening bolt 19 attached to the wheel contact plate 2. Since the actuators 16, 17 are arranged laterally with respect to the axis of rotation D or the third rotary joint 15, a force imparted by one of the four actuators 16, 17 causes a torque about the axis of rotation D, and a change in length of the actuators 16, 17 is converted into a rotational movement of the wheel contact plate 2 relative to the pedestal plate 14 and therefore relative to the foundation 101.

The actuators 16, 17 may, as already described for the other actuators, be designed as hydraulic, electric or pneumatic actuators. If one of the actuators 16 is designed as a double-acting cylinder, then the second of the fourth actuators 17 can be dispensed with. It is also possible to use actuators which directly generate a rotational movement. These are for example electric, hydraulic or pneumatic motors which impart a torque to, and produce a rotational movement of, the wheel contact plate 2 directly or via a gearing.

It is advantageous, as described, for the pedestal plate 14 to be connected directly to the wheel contact plate 2, that is to say for only the elements required for the rotational movement about the axis of rotation D to be arranged between the pedestal plate 14 and wheel contact plate 2. The rotational forces are usually lower than the vertical and tilting forces, because said rotational forces are not determined by the weight of the vehicle. The fourth actuators 16, 17 may therefore be designed to be smaller than the other actuators 3a, 3b, 4, 5, 6, 7, and constitute a lower additional mass to be moved by the first, second and third actuators. Furthermore, in said arrangement, the rotational movement about the axis of rotation D is decoupled from the other movements and allows a simpler simulation, because the rotational movement about D has no influence on the other movements about K1, K2 or along L1.

From a design aspect, it may however also be expedient for the pedestal plate 14 and the elements required for the rotation about the axis of rotation D to be arranged between the foundation and the first actuator 3a, 3b or between the first actuator 3a, 3b and the second actuators 4, 5 and third actuators 6, 7. In this case, the coupling of the rotational movement about the axis of rotation D to the tilting and longitudinal movements must be compensated by means of suitable activation of the other actuators.

As indicated in the drawings, the wheel contact plate 2 may have stop elements at its edge region. The stop elements run preferably in the direction of the longitudinal axis and/or of the transverse axis of the vehicle wheel 1, and serve to prevent the vehicle wheel 1 from sliding off the wheel contact plate 2 during the operation of the test stand 100. The stop elements are self-evidently not wheel fixing means, such that the dynamic natural oscillation behavior of the roadway/tires/chassis system can be realistically simulated.

The test stand 100 according to the invention is characterized in that the respective wheel contact plates 2 can be tilted about the transverse axis K1 and the longitudinal axis K2 of the vehicle wheel 1 relative to the foundation 101 of the test stand 100. Here, a longitudinal force can be generated by means of the tilting movement about the transverse axis (=first tilting axis K1), whereas a side force can be generated by means of the tilting about the longitudinal axis (=second tilting axis K2).

In particular, it is possible by means of the solution according to the invention for significant longitudinal and lateral forces to be introduced directly into the vehicle wheel 1, thereby allowing a reproduction of longitudinal and side forces which is accurate in terms of phase and amplitude. Since the excitation forces are introduced into the vehicle from the wheel contact plate 2 via the vehicle wheel 1, a real introduction mechanism is reproduced.

The central position of the wheel contact plate 2 correlates directly to the displacement travel or cylinder travel of the first actuator 3a, 3b (vertical cylinder) and the inclination of the wheel contact plate correlates directly to the difference between the cylinder travels of the tilting cylinders (second and third actuators). The activation signals of the actuators can therefore be interpreted directly as an abstract road profile. It is therefore possible for the activation signals to be directly transferred from a first vehicle type to a modified second vehicle type. Accordingly, the test stand principle disclosed in this document is variant-compatible.

Since the components required for realizing the tiltable wheel contact are relatively small, and in particular since no additional externally acting actuators are required, the test stand 100 according to the invention is suitable even for vehicles having more than two axles. Furthermore, if necessary even existing four-plunger or multiple-plunger systems can be easily retrofitted because the solution according to the invention is characterized firstly by its modular design and secondly by the separation of the tilting mechanism from the vertical cylinder (=first actuator 3a, 3b). Conversely, a conventional four-plunger system can be adapted by deactivating the tilting movement.

Furthermore, an additional advantage is that intense decoupling of the excitations is attained, because there is on the one hand a high degree of correlation of the cylinder travel of the vertical cylinder (=first actuator 3a, 3b) and on the other hand a high degree of correlation of the tilting angle to the longitudinal and side forces.

The solution according to the invention is not restricted to the embodiments described above with reference to the drawings, but rather emerges from a juxtaposition of all the features disclosed herein.

In particular, the drawings show in each case only a single wheel contact plate 2 with a single vehicle wheel 1 positioned thereon. The test stand 100 according to the invention may in contrast have a multiplicity of wheel contact plates 2 with associated actuator units, wherein the number of wheel contact plates 2 preferably corresponds to the number of wheels 1 of the vehicle to be tested. It would however also be possible for a test stand 100 according to the invention to be provided for example only for a single vehicle axle or wheel suspension.

The invention claimed is:

1. A test stand (100) for the simulation of forces and moments introduced into a motor vehicle or into parts of a motor vehicle during driving operation, the test stand (100) having the following:
   at least one wheel contact plate (2) for receiving a vehicle wheel (1); and
   at least one first actuator (3a, 3b), connected at one side to a foundation (101) of the test stand (100) and at the other side to the wheel contact plate (2), for moving the wheel contact plate (2) along a first axis (L1), along the vertical axis, relative to the foundation (101) of the test stand (100),
   the at least one first actuator (3a, 3b) being connected to the wheel contact plate (2) in such a way that the wheel contact plate (2) is rotatable about a first horizontally running tilting axis (K1);
   the test stand (100) also having at least one second actuator (4, 5), engaging on the wheel contact plate (2), for rotating the wheel contact plate (2) about the first horizontally running tilting axis (K1);
   the at least one first actuator (3a, 3b) being connected to the wheel contact plate (2) via a joint arrangement (9) which allows a rotational movement of the wheel contact plate (2) relative to the foundation (101) of the test stand (100); and
   the joint arrangement (9) having a third rotary joint (15) which allows a rotational movement of the wheel contact plate (2) about an axis of rotation (D) relative to the foundation (101) of the test stand (100), the axis of rotation (D) running obliquely with respect to the first tilting axis (K1) and obliquely with respect to the second tilting axis (K2).

2. The test stand (100) as claimed in claim 1, the joint arrangement (9) having a ball joint or a cardan joint.

3. The test stand (100) as claimed in claim 1, the test stand (100) having two second actuators (4, 5) which are arranged on both sides of the first axis (L1) and engage in each case on the wheel contact plate (2).

4. The test stand (100) as claimed in claim 1, the joint arrangement (9) having a first rotary joint which allows a rotational movement of the wheel contact plate (2) about the first horizontally running tilting axis (K1) relative to the foundation (101) of the test stand (100).

5. The test stand (100) as claimed in claim 4, the joint arrangement (9) also having a second rotary joint which allows a rotational movement of the wheel contact plate (2) about the second horizontally running tilting axis (K2) relative to the foundation (101) of the test stand (100).

6. The test stand (100) as claimed in claim 1, the test stand (100) also having at least one sensor for measuring a deflection of the wheel contact plate (2) along the first axis (L1) and/or for measuring a rotational movement of the wheel contact plate (2) about the first and/or the second tilting axis (K1, K2) and/or about the axis of rotation (D).

7. The test stand (100) as claimed in claim 6, the test stand (100) also having at least one controller which is designed to activate the appropriate actuators as a function of the deflection or rotational movement detected by the at least one sensor and as a function of predetermined or predeterminable setpoint values for the deflection or rotational movement.

8. The test stand (100) as claimed in claim 1, the test stand (100) also having
at least one third actuator (6, 7), engaging on the wheel contact plate (2), for rotating the wheel contact plate (2) about a second horizontally running tilting axis (K2), the second tilting axis (K2) running obliquely with respect to the first tilting axis (K1) and perpendicularly with respect to the first tilting axis (K1).

9. The test stand (100) as claimed in claim 8, the test stand (100) having two third actuators (6, 7) which are arranged on both sides of the first axis (L1) and engage in each case on the wheel contact plate (2).

10. The test stand (100) as claimed in claim 8,
the at least one second actuator (4, 5) being connected to the wheel contact plate (2) via a joint arrangement (8), via a cardan joint; and/or the at least one third actuator (6, 7) being connected to the wheel contact plate (2) via a joint arrangement (8'), via a cardan joint.

11. The test stand (100) as claimed in claim 8, the first actuator (3a, 3b) having a hydraulically, pneumatically or electrically actuable piston (3b) which is moveable along the first axis (L1) relative to the foundation (101) of the test stand (100), and the at least one third actuator (6, 7) being connected on the one hand to the piston (3b) and on the other hand to the wheel contact plate (2).

12. The test stand (100) as claimed in claim 11,
the test stand (100) also having at least one fourth actuator (16, 17), engaging on the wheel contact plate (2), for rotating the wheel contact plate (2) about the axis of rotation (D), and
the at least one fourth actuator (16, 17) being connected on the one hand to the piston (3b) and on the other hand to the wheel contact plate (2).

13. The test stand (100) as claimed in claim 12,
the first actuator (3a, 3b) and/or the second actuator (4, 5) and/or the third actuator (6, 7) and/or the fourth actuator (16, 17) having in each case a double-acting hydraulic or pneumatic cylinder.

14. The test stand (100) as claimed in claim 1,
the at least one wheel contact plate (2) having a reception dish for receiving the vehicle wheel (1).

15. The test stand (100) as claimed in claim 14,
the reception dish having rolling bodies or balls, mounted rotatably on its base and/or side faces.

16. The test stand (100) as claimed in claim 14, the reception dish having a mechanical grid-type clamping system for displacing the base and/or side faces of the reception dish for the purpose of adapting the reception dish to tires of different diameter and of different width.

17. The test stand (100) as claimed in claim 14, the reception dish being connected releasably to the wheel contact plate (2).

18. The test stand (100) as claimed in claim 14, the wheel contact plate (2) being designed as a reception dish.

* * * * *